United States Patent

[11] 3,599,282

[72] Inventors Dale J. Meyers;
 James E. Ditty, both of Logan, Ohio
[21] Appl. No. 812,692
[22] Filed Apr. 2, 1969
[45] Patented Aug. 17, 1971
[73] Assignee The Goodyear Tire & Rubber Company
 Akron, Ohio

[54] APPARATUS FOR MOLDING FOAM ARTICLES
 3 Claims, 4 Drawing Figs.
[52] U.S. Cl. .................................................. 18/5 P,
 264/54
[51] Int. Cl. ...................................................... B29c 3/04
[50] Field of Search ............................................ 18/30 PS, 4
 B, 5 P, 1 M, 5 M, 26 M; 25/1 M; 141/232, 233;
 264/45, 54; 260/2.5 AX

[56] References Cited
 UNITED STATES PATENTS
| | | | |
|---|---|---|---|
| 449,043 | 3/1891 | Howard ........................ | 18/26 M X |
| 2,442,607 | 6/1948 | Leguillon et al. ............. | 18/30 PS |
| 3,249,486 | 5/1966 | Voisinet et al. ............... | 18/5 P |
| 3,450,173 | 6/1969 | Maizel .......................... | 141/232 |

FOREIGN PATENTS
| | | | |
|---|---|---|---|
| 30,678 | 4/1920 | Norway ....................... | 141/232 |

*Primary Examiner*—J. Spencer Overholser
*Assistant Examiner*—Lucius R. Frye
*Attorneys*—F. W. Brunner and J. D. Wolfe ABSTRACT: This disclosure relates to a molding apparatus having a mold support means with molds positioned thereon and means above the molds to permit a mixing head to move above the molds and having flexible connections to the foamable ingredient's supply system.

INVENTORS
JAMES E. DITTY
BY DALE J. MEYERS
J.D. Wolfe
ATTORNEY

INVENTORS
JAMES E. DITTY
DALE J. MEYERS
BY
J.D. Wolfe
ATTORNEY

APPARATUS FOR MOLDING FOAM ARTICLES

This invention relates to an apparatus capable of pouring a foamable mixture into molds positioned in a desired pattern on a pouring floor.

In the molding of foamed articles having a skin that has been preformed it is necessary that the mold be of sufficient strength to maintain the preformed skin in the desired configuration while the foam is expanding within the cavity of the preformed skin. Likewise, in molding any foamable material it is required that the mold be of sufficient strength to withstand any pressure developed during the molding operation. Consequently, the molds used in molding foamed articles tend to be relatively large and bulky and difficult to move. Therefore, it has been found desirable to provide apparatus that can be moved to the mold to pour the mold and thus keep the time between the actual mixing and formation of the foamable reaction mixture and its addition to the mold to essentially a minimum to avoid the difficulties inherent in the use or pouring of a foamable mixture which is relatively aged.

Therefore, an object of this invention is to provide an apparatus whereby the molds may be positioned on or about the pouring floor and the pouring head or means can be moved from one mold to the next to achieve pouring of the foamable mixture into the mold without the foamable mixture being appreciably aged.

This object and other advantages of this method of molding foamed articles can be more readily appreciated by reference to the drawings wherein.

Figure 1:
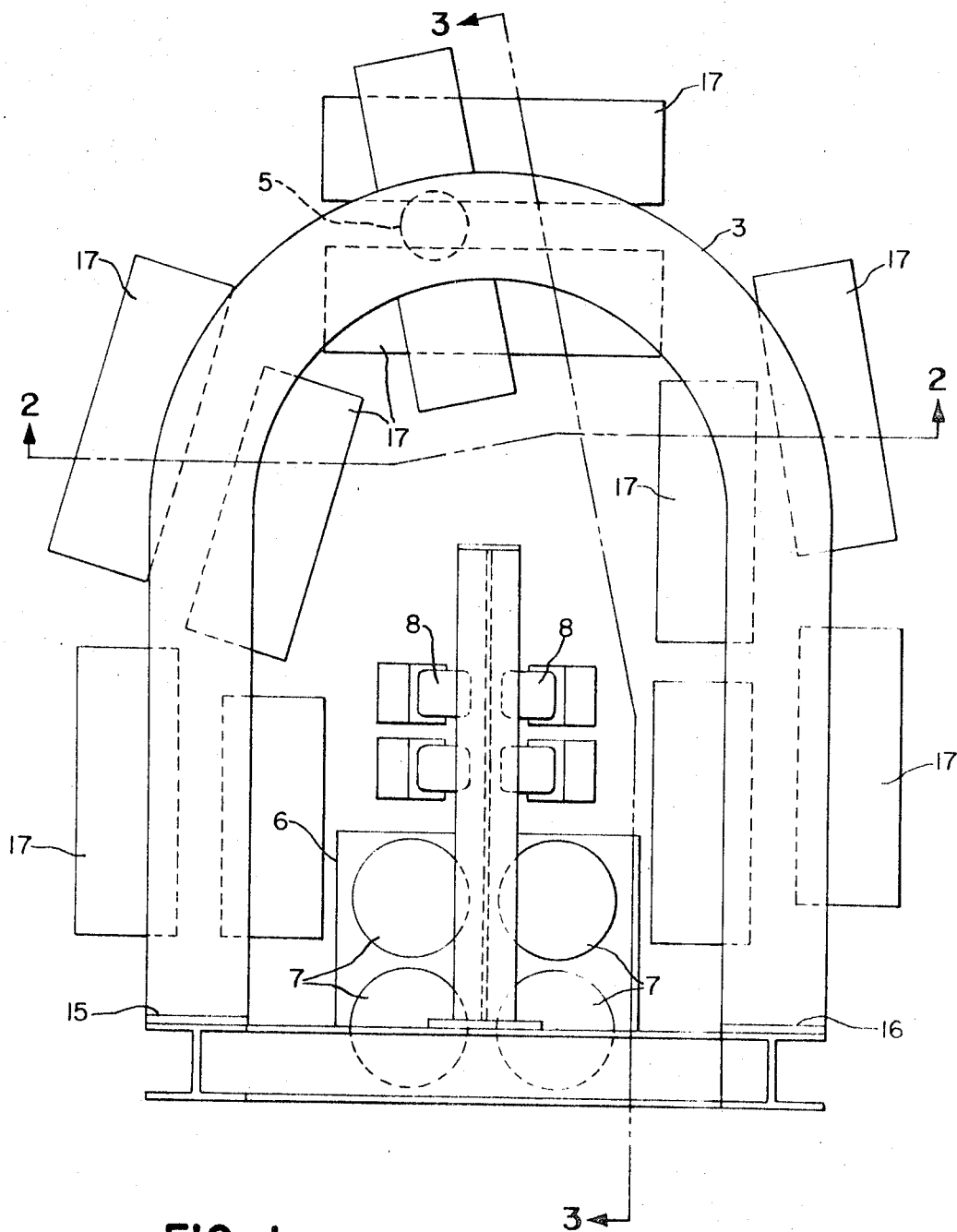
FIG. 1 is a planned view of the molding apparatus.

Referring to the drawings, numeral 3 represents a double track suspended above a pouring platform 4 with the track 3 being preferably an arc of a circle to reduce the distance traveled by the pouring head and to permit the pouring head 5 to be located relatively close to the central storage tanks 6. It is desired that the track be either a semicircle (arc of a circle or ellipse) or U-shaped to obtain these desired features.

Referring again to FIG. 1 it will be noted that within the foamable ingredients' storing area 6 there are a series of tanks 7 which contain the foamable ingredients which may have heaters (not shown) for adjusting the temperature of the ingredients, for instance, to above the melt temperature of said ingredient. Associated with each of these tanks is a pump 8. A line 9 extends from each tank to a pump 8 and from the pump 8 to the pouring head 5. Also associated with each feed line, where desired, is a recycle line from the pouring or mixing head valve to each specific ingredient storage tank. Lines 9 include a series of flexible lines 10 that are suspended overhead in convolute curves 11 or loops 11 to permit the pouring head to be moved on the tracks 3 by causing the wheels 12 associated with the carriage 13 for the pouring head 5 to move in the desired direction. The movement of the pouring head and its associated carriage is achieved preferably by applying push or pull with the hand on the hand member 14 of the pouring head. Thus, by applying suitable push or pull the pouring head can be moved from the stop 15 through various intermediate positions around the track to the stop 14 or returned from the stop 14 through various intermediate stops to stop 16. To operate this apparatus the molds 17 are placed on the floor essentially under the track 3, preferably in a semicircle or U-shaped arrangement as shown best in FIG. 1. Where the mold is to be used to form a foamed article without preformed skin the mold is opened and coated with a mold release agent such as a polyethylene or wax. Then the pouring head is moved over the mold and the operating means, i.e., the start button 18 in the electric circuit with the pump motors and the solenoid valve in the feed lines to the mixing head is activated to cause the mold to receive the desired amount or load of foamable mixture. As soon as the charge or load of foamable mixture has been added to the mold the solenoid valve mechanism 20 associated with the pouring head 5 is closed by hand activation of the switch 21 in the panel board 19 associated with the pouring head. It is preferred that the activation of start button 18 also start a timer that activates switch 21 on expiration of the set time to stop the pour. When the pour is stopped, the pouring head is then moved to the next mold, preferably a successive one, where another charge of a foamable reaction mixture is added to a mold. As soon as the pouring head is moved from over the last poured mold, that mold is closed and the lid preferably is fastened although in some instances the lid may be allowed to float upward in accordance with the well-known floating lid technique.

It should be noted that as the pouring head moves around the track 3 flexible pipe hangers 22 must move back and forth on wheels 24 in the flexible pipe trackway 23. It should also be noted that as the pipe hangers move apart along the trackway the shape of the convolute cures of the flexible pipe or hose changes to permit the pouring head to move along the track to either increase or decrease the distance from the pouring head to the storage tanks 7.

Where the foamed article to be manufactured has a preformed skin, it can be made by hot melt molding techniques for the thermoplastic resins or polymers or by vacuum forming the skin from a warm film of a thermoplastic resin.

Representative of the many thermoplastic resins or polymers that may be employed in the present invention to cast or form the skin are vinyl polymers preferably in the high viscosity range. Preferred among the latter are the polymers of vinyl chloride, vinyl acetate, vinyl butyral, and copolymers of vinyl chloride and vinyl acetate. A copolymer which has proven satisfactory is one prepared from 93 to 95 percent vinyl chloride and the balance vinyl acetate, with an average molecular weight of approximately 24,000 as determined by the Staudinger method, and having a specific gravity of about 1.34 to 1.37, and softening at approximately 150° F. These above-mentioned polymer materials, when formed for present purposes, require no chemical or other treatment except the addition of a plasticizer. Also, the thermoplastic ABS resin acrylonitrile-butadiene-styrene polymer) can be used to form the skin. Plasticizers are employed which are compatible with these polymers, and which contain no constituents that are, as in the case of the polymers, reactive with atmospheric oxygen in the range of atmospheric temperatures. Examples of such plasticizers are tricresyl phosphate, dioctyl phthalate, dicapryl phthalate, dibutyl sebacate, dibutoxy ethyl phthalate, dibutoxyglycol phthalate, polyethyleneglycol di-2-ethyl hexoate, triethylene-glycol-di-2-ethyl hexoate and the like.

A representative example of how this invention can be practiced is shown below with all parts being by weight unless otherwise indicated.

EXAMPLE I

Using apparatus of the type described in patent application, Ser. No. 645,385 filed June 12, 1967, a box containing dry commercial powdery plasticized polyvinyl chloride resin was rotated as a unit with a crash pad for automobile forming mold. As the mold was at about 500° F. the powdery polyvinyl chloride fused to form a skin of about 5 to 15 mils in thickness depending on duration of the rotation before excess resin was dumped.

The skin was removed from the mold and placed in a rigidizing or retaining mold located on the floor as shown in FIG. 1. Then sufficient polyurethane foamable mixture was added from the pouring head which had been moved above the mold to fill the mold when foaming was complete. Then the mixing head was moved to the next mold, the mold was closed and the foamable mixture was allowed to foam and cure. Then the mold was opened and the finished crash pad removed from the mold.

A polyether urethane foamable reaction mixture used to form the crash pad in example I was prepared by mixing about 94.0 equivalents of a polypropylene ether triol, 6.85 equivalents of tolylene diisocyanates, then 180 parts of this mixture is mixed with 3.7 parts of N, N, N′, N′-tetrakis (2-hydroxy propyl) ethylene diamine, 15.5 parts of glycerol with varying amounts of amine-type catalysts such as triethylene diamine and/or N-ethyl morpholine and from 1 to 2 parts of an auxiliary blowing agent, $CFCl_3$.

A suitable vinyl plastisol for use in rotational casting a skin in accordance with the above example is

|  | Parts |
|---|---|
| Polyvinyl chloride (dispersion grade) | 100 |
| Di-2-ethylhexylphthalate (plasticizer) | 90 |
| Barium and cadmium salt complex (heat and light stabilizer) | 3 |
| Calcium carbonate (filler) | 10 |
| mineral oil (internal lubricant) | 2 |

Other vinyl polymers may be used to form plastisols or powder sols, as for example, polyvinyl acetate, polyvinyl alcohol and chlorosulfonated polyethylene and various vinyl copolymers such as a copolymer of vinyl chloride and vinylidene chloride, as are well known in the art. Various plasticizers such as oxidized soybean oil and diethylene glycol may be used and various other ingredients may be added to form films having desirable characteristics as is well known in the art.

Also, other thermoplastic molding powers such as the terpolymer of acrylonitrile, butadiene and styrene may be used to form the skin.

The polyurethane suitable for use in forming the foam may be the reaction product of an organic polyisocyanate and a polyester, a polyether polyol or a polyhydrocarbon polyol with or without the use of an auxiliary blowing agent such as the low boiling materials, for instance, fluorinated hydrocarbons and/or water.

Figure 2:
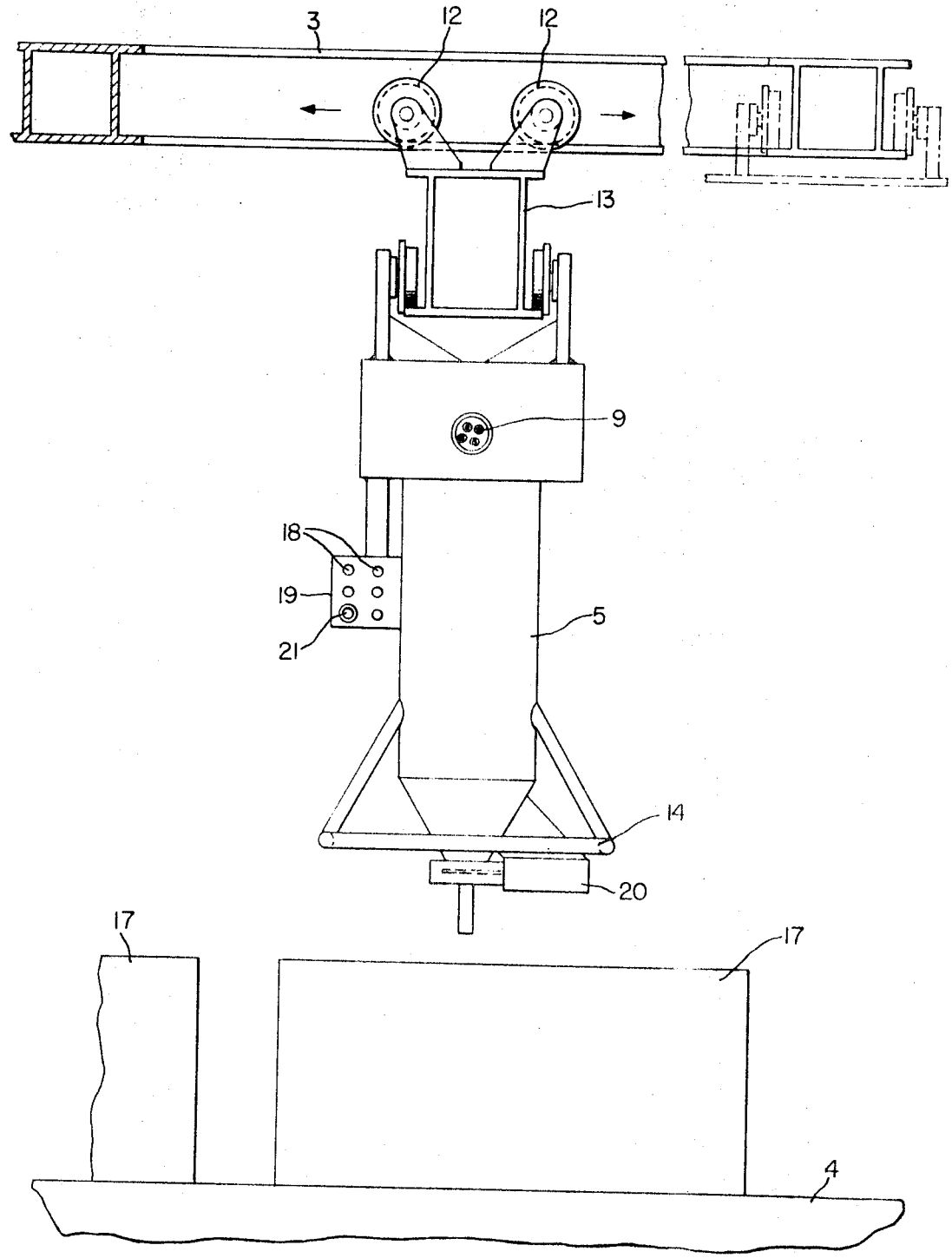
FIG. 2 is an elevational view along the lines 2–2 of FIG. 1.
Figure 3:
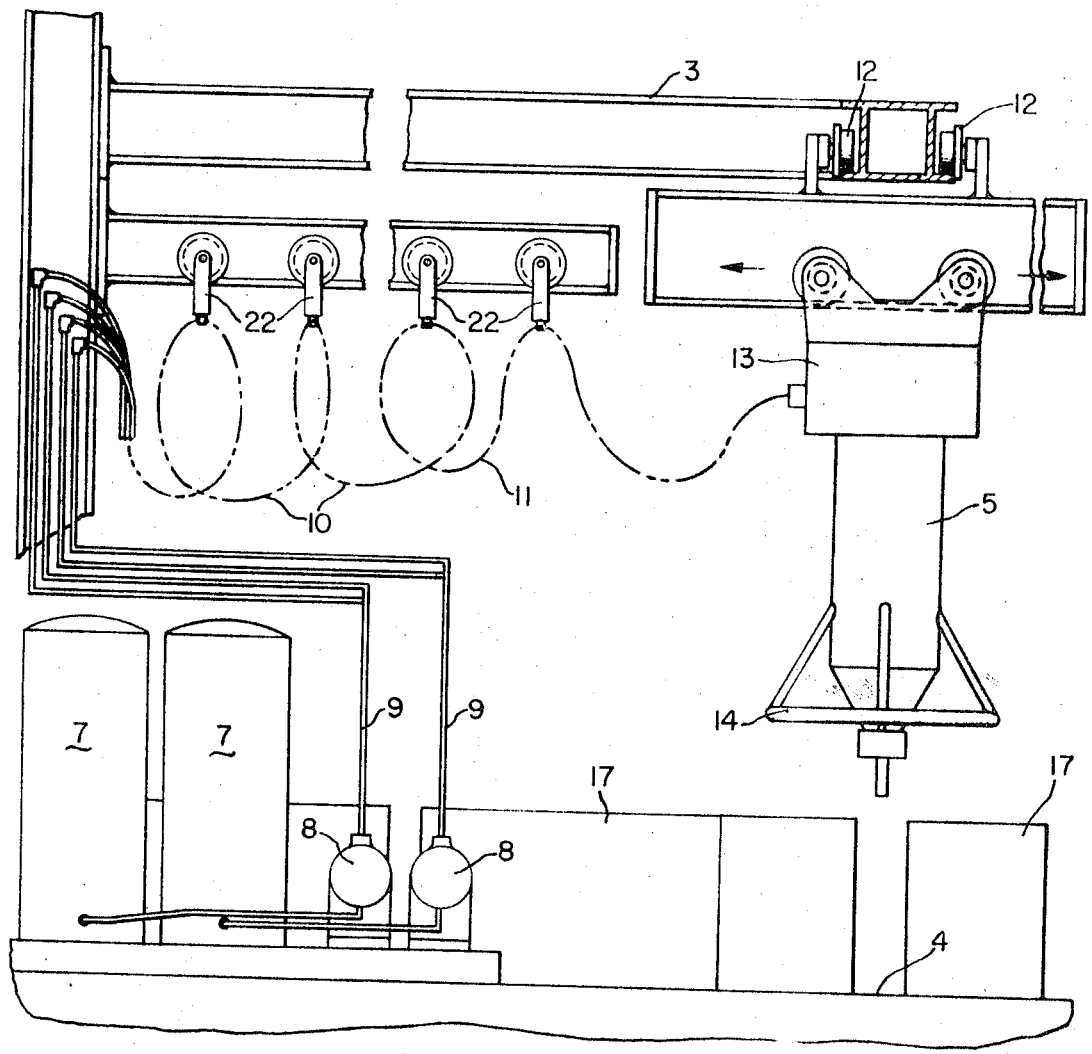
FIG. 3 is an elevational sectional view along the lines 3–3 of FIG. 1 showing the convolute flexible line arrangement for connecting the mixing head to the feed pump from the ingredient storage tanks.

Although the apparatus shown in FIGS. 1 to 3 is shown with stationary horizontal molds, this apparatus is particularly desirable for pouring large articles having an integrate configuration where difficulty is experienced in getting air entrapment or the foaming mixture spread in the desired pattern within the mold. In this instance, the flexibility of this apparatus permits a tilting mold to be used. Thus, the degree of tilt of the mold can be used to facilitate the spreading of the foamable mixture throughout the mold cavity and to allow the escape of air as the foaming mixture expands. Then when the foam is cured, the mold can be returned to the horizontal position to permit the mold to be opened and closed more readily, as well as to allow the foamed article to be stripped from the mold and a new skin to be placed therein.

Figure 4:
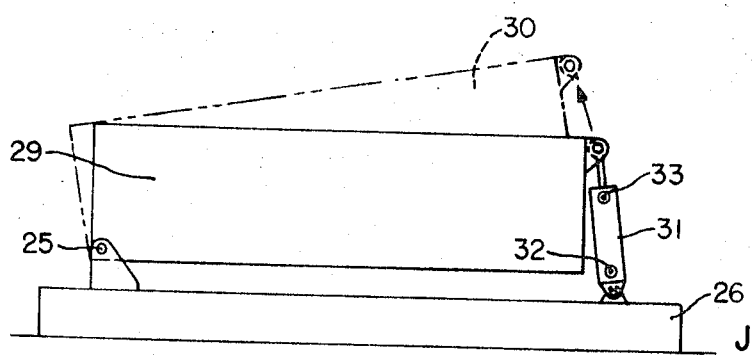
FIG. 4 is a partial sectional view in elevation of the apparatus showing a tilting mold.

A preferred embodiment of the tilting mold is shown in FIG. 4 wherein the retaining mold is hingeably mounted 25 on the mold carriage or stand 26 and a hydraulic cylinder 27 is positioned in the stand at the other end 28 of the mold to move the mold from the horizontal position 29 to the tilt position 30 (shown in dotted outline) in response to the hydraulic fluid to the hydraulic cylinder 31 by lines 32 and 33. Also, by giving the track 3 an S-shape in the vertical plane it is possible to vary the height of the mixing or pouring head from the floor to maintain the desired distance from the mold to the pouring head and thereby minimize spattering as different types and shapes of foamed articles are molded.

While certain representative embodiments and details have been shown for the purpose of illustrating the invention, it will be apparent to those skilled in this art that various changes and modifications may be made therein without departing from the spirit or scope of the invention.

What I claim is:

1. A molding apparatus comprising in combination, a mold support means having molds positioned thereon, a mixing head for the foaming ingredients which is connected by flexible means to the supply means for the foaming ingredients, means to support the mixing head above the mold support and to permit the mixing head to move from one mold to the next mold without regard to sequence to position the mixing head above the mold in mold-filling relationship, the flexible means being suspended convolutely from an overhead trackway and movable back and forth in said trackway in response to the movement of the mixing head.

2. The apparatus of claim 1 wherein the means for suspension of the mixing head is a track arranged in a curve approximating a U-shape around the means for supplying the foaming ingredients.

3. The apparatus of claim 1 wherein the mold has a means for changing the elevation at one end thereof.